United States Patent [19]

Hatch et al.

[11] 4,409,048

[45] Oct. 11, 1983

[54] HIGH TEMPERATURE CONSOLIDATION PROCESS

[75] Inventors: Donald M. Hatch, Huntington Beach; Richard J. Larsen, Torrance, both of Calif.

[73] Assignee: Hitco, Newport Beach, Calif.

[21] Appl. No.: 556,889

[22] Filed: Mar. 10, 1975

[51] Int. Cl.³ .............................................. B32B 31/00
[52] U.S. Cl. ...................... 156/155; 156/87; 156/245; 156/274.8; 156/285; 156/287; 156/307.5; 156/312; 264/25; 264/29.5; 264/29.7; 264/80; 264/519; 423/447.1; 423/447.2; 427/228; 428/408
[58] Field of Search ............... 156/87, 155, 218, 245, 156/312, 285, 287, 1, 272, 306; 428/408, 524; 423/447; 427/226, 228, 444; 264/25, 94, 234, 345, 105, 28, 88, 89; 264/80, 319, 320, 331

[56] References Cited

U.S. PATENT DOCUMENTS

| | | | |
|---|---|---|---|
| 3,089,195 | 5/1963 | Woodburn, Jr. | 264/29.5 |
| 3,182,102 | 5/1965 | Simnad | 264/25 |
| 3,249,964 | 5/1966 | Shaler | 264/29 |
| 3,295,559 | 1/1967 | Beasley et al. | 156/1 |
| 3,405,205 | 10/1968 | Rowe et al. | 264/105 |
| 3,462,289 | 8/1969 | Rohl et al. | 427/228 |
| 3,550,213 | 12/1970 | Ormsby et al. | 264/29.5 |
| 3,917,884 | 11/1975 | Jahn | 427/228 |

*Primary Examiner*—John J. Gallagher
*Attorney, Agent, or Firm*—Fraser and Bogucki

[57] ABSTRACT

A carbon-organic resin composite which has been initially shaped as by molding and in which the resin binder has been at least partially precured is transformed into an all-carbon composite and substantially densified by a continuous process in which the composite is continuously heated at different temperatures and subjected to increased pressure. Initially, the composite is heated at a first rate to a temperature on the order of 1000° F., the first rate and the increased pressure applied to the composite being selected to substantially decompose the resin rapidly but without delamination or other damage to the composite. Heating is then continued at a second rate until the composite undergoes substantial softening and becomes plastic, typically at a temperature in excess of 3500° F. Thereafter the composite is maintained at a high temperature, typically in excess of 5000° F., for a selected period of time while at the same time continuing the application of high pressure to provide substantial densification of the composite. The continuous process is carried out in 6-12 hours for composites within a given size range.

20 Claims, 17 Drawing Figures

HIGH TEMPERATURE CONSOLIDATION PROCESS

BACKGROUND OF THE INVENTION

1. Field of the Invention

The present invention relates to processes for making carbon-carbon composites, and more particularly to processes in which a composite comprised of carbon and a resin binder is treated to carbonize the resin binder and densify the composite to provide the composite with desirable properties including high temperature oxidation resistance.

2. History of the Prior Art

Carbon-carbon composites are useful in various applications including brakes for automotive vehicles and aircraft, rocket nozzles, and other missile components. Such composites are made from a mixture of carbon and a resin binder. The carbon is made from an organic material which has been carbonized or graphitized and which may assume various forms such as a woven fabric, fibers of selected length and diameter or a matte. In many instances such materials are mixed with a filler which is of carbon composition such as carbon black. The resin binder is an organic type which will char when subjected to high temperature processing so as to ultimately provide a carbon-carbon composite.

In prior art processes for making carbon-carbon composites the initial mixture of carbon material and an organic resin binder is treated such as by molding to provide the composite with a desired shape. The resin binder is at least partially cured by heating for a selected period of time. The resin binder is then carbonized such as by heating to 700°-1000° F. for 100-250 hours. The carbonization step is carried out very slowly so as not to delaminate or otherwise damage the composite. Delamination or other damage to the composite readily occurs due to the substantial decomposition of the resin and the large number of volatiles which are driven from the resin during carbonization. Following carbonization of the resin binder, the resin binder is typically pyrolyzed such as by heating the composite to 4000°-4500° F. for 12-40 hours.

At the end of the pyrolyzing step the composite is of substantially all-carbon composition but has less density than the original composite, is subject to oxidation at relatively low temperatures and otherwise exhibits poor physical properties. To increase the density and high temperature resistance of the composite, further processing steps are normally carried out. One approach is to reimpregnate and repyrolyze the composite. This may be done numerous times, and eventually results in a composite of relatively high density and therefore improved temperature resistance. Another approach is to subject the composite to chemical vapor deposition such as by placing the composite in a hot furnace in the presence of methane. This process when carried out for 100-400 hours provides the composite with some densification and high temperature resistance.

The multiplicity of different and separate steps requiring several days or longer in prior art processes for making carbon-carbon composites make such materials very expensive and impractical for many applications. In an effort to simplify the processing involved, certain techniques have been tried. An example of such techniques is provided by U.S. Pat. No. 3,734,797, Byers, issued May 22, 1973. The Byers patent recognizes that during carbonization of the resin binder in the formation of a carbon-carbon composite, large amounts of volatiles are released from the resin binder. The Byers patent goes on to disclose that by providing the composite with perforations and by applying pressure to the composite during carbonization, removal of the volatiles is accomplished without delamination or other damage to the composite. However the resulting composite is still far from having the requisite density and high temperature resistance for most applications, requiring that further processing steps of the type described above such as reimpregnation and repyrolyzation or chemical vapor deposition be employed. As a result the process for making the carbon-carbon composite, while somewhat simplified, is still far from being as simple and economical as it should be. Moreover, the end product still has lower density and high temperature oxidation resistance than is desired for such materials.

Accordingly it is an object of the present invention to provide a process for forming high density, high temperature resistant carbon-carbon composites.

It is a further object of the present invention to provide a process for making high density, high temperature resistant carbon-carbon composites which is not only simplified and economical but which provides for relatively reliable and uniform results.

It is a still further object of the present invention to provide a process for making high density, high temperature resistant carbon-carbon composites which is easily controlled and varied so as to optimize the process for certain applications and to optimize the properties of the resulting composite for particular requirements.

It is a still further object of the present invention to provide a process for making high density, high temperature resistant carbon-carbon composites in which the composites can assume a variety of different shapes and configurations while still taking advantage of a greatly simplified and more economical process.

BRIEF SUMMARY OF THE INVENTION

In processes according to the invention a composite of carbon (or graphite) material and an organic resin binder is initially molded or otherwise processed to provide the composite with a desired shape and to at least partially cure the resin binder. Thereafter, the resin-bonded composite is subjected to a continuous process in which the resin binder is carbonized at a relatively rapid rate without delamination or other damage to the composite and in which the composite is thereafter highly densified and heat treated. Composites having a very high density, substantial high temperature oxidation resistance and other improved properties can be made in short periods of time such as 6–12 hours for a given size range using a continuous process in accordance with the invention.

In the continuous process of the invention, the composite is heated in a non-oxidizing atmosphere in the presence of increased pressure through a first temperature range. At the end of the first temperature range the resin binder has undergone substantial decomposition and is generally carbonized. The rate of heating through the first temperature range is selected so as to provide substantial decomposition of the resin binder relatively rapidly but at the same time without delamination or other damage to the composite. The increased pressure applied to the composite helps to prevent delamination of the composite, thereby permitting a relatively high heating rate. In the case of composites which are several inches in diameter, substantial decomposition of the resin binder without delamination or other damage to the composite can be accomplished by heating the composite from room temperature to a temperature on the order of 1000° F. at a relatively constant rate over a period of 1½–6 hours.

When the temperature of the composite reaches approximately 1000° F., heating of the composite is continued until the composite undergoes substantial softening and becomes plastic. The rate of the continued heating is chosen so as to heat the composite to a plastic state in rapid fashion. For composites of several inches diameter a period of 2–4 hours is required to raise the temperature from about 1000° F. to a temperature in excess of 3000° F. and typically on the order of 4500°–5000° F. where the composite becomes increasingly plastic.

When the composite reaches the proper plastic state the temperature is at least maintained if not increased slightly in the presence of the high pressure which is applied to the composite. The high temperature and pressure are maintained for a selected period of time which is typically on the order of 1½–4 hours for composites of several inches diameter and which is long enough to provide the requisite amount of densification and high temperature treatment of the composite. With the composite in the plastic state the amount of compaction thereof in response to high pressure is substantial. The composite tends to undergo more and more compaction with time in the presence of the high temperature and pressure so that substantial densification occurs and continues even after several hours. At the same time the high temperature of the composite which is typically in excess of 5000° F. heat-treats the composite so that the resulting product has substantially increased density and improved physical and thermal properties.

In a preferred arrangement for carrying out processes in accordance with the invention the composite is placed within a hollow die located inside an electric induction furnace. Heating is accomplished by applying electrical power to an induction coil which surrounds the die and transfers heat to the die and to the composite located therein. Pressure is applied to the composite by a pair of opposing punches which are disposed in contact with opposite sides of the composite and which are forced toward one another by a hydraulic press to apply the desired amount of high pressure to the composite. In an alternative arrangement for forming composite parts having a hollow interior, the composite is disposed within a die which contacts all surfaces of the composite except the inside surface. Pressure is then applied to the inside surface of the composite by carbon powder disposed between the opposing punches and which acts as a pressure transmitting fluid in response to the punches.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIGS. 5–15 are diagrammatic plots of temperature, compaction and pressure as functions of time, illustrating various different examples of processes in accordance with the invention.

DETAILED DESCRIPTION

Figure 1:
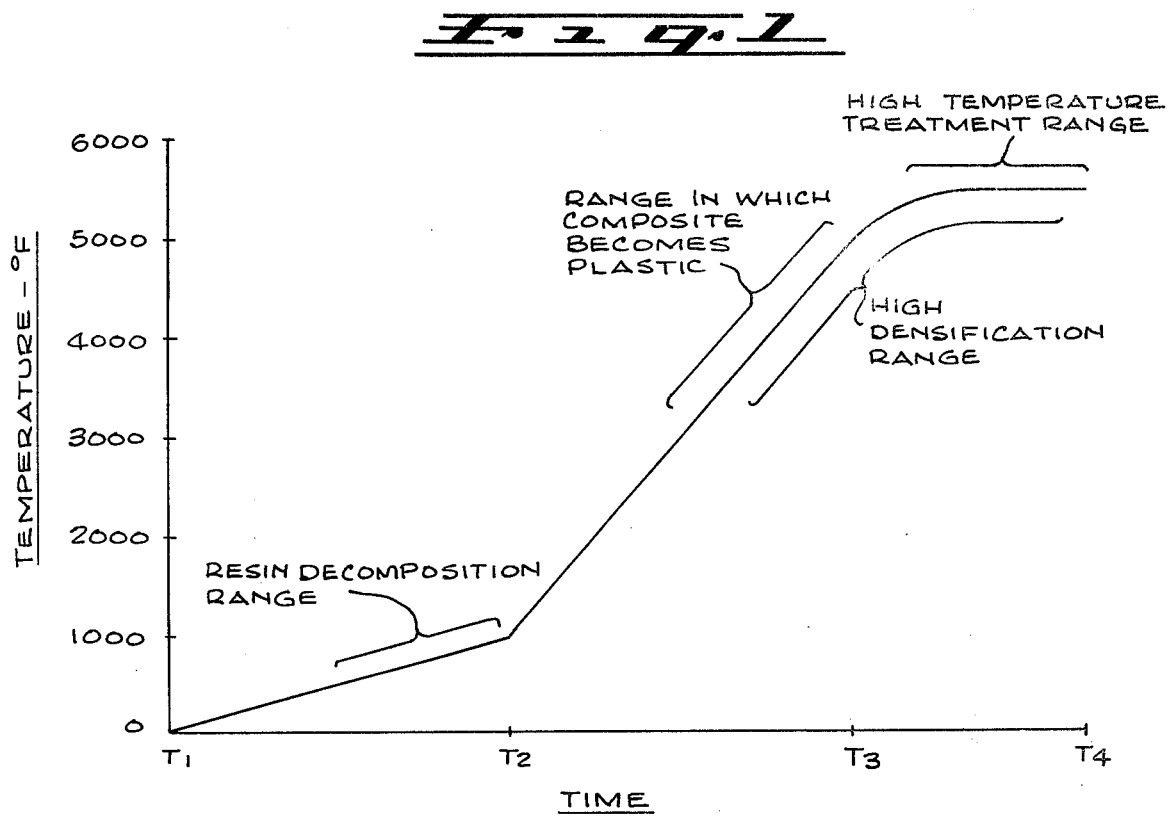
FIG. 1 is a diagrammatic plot of temperature as a function of time comprising a typical temperature profile used in processes according to the invention.

Carbon-carbon composites made by processes in accordance with the invention are initially prepared by forming a mixture of carbon material and an organic resin binder. The term "carbon" as used herein is assumed to include any of the various carbonaceous materials of different form such as carbon, graphite or high modulus graphite. The carbon material can assume different physical forms and arrangements including fabric, matte or fibers. Where desired the fabric, matte or fibers can be mixed with a filler such as carbon black, lamp black or asbestos. The presence of such a filler is desirable in many instances in that it tends to provide escape paths for gases and other volatiles as the organic resin binder decomposes and is carbonized. The organic resin binder can comprise any appropriate organic resin which will char. Examples of organic resins which can be used include those of the phenolic type, those of the furfuryl type and those which are pitch based.

After the carbon-resin binder composite is formed, the composite is provided with a desired shape and the resin binder is at least partially cured using appropriate conventional steps. Where the carbon material is principally in fabric or matte form, forming of the composite into a desired shape is accomplished in part simply by cutting out layers of the carbon material of appropriate size and shape and stacking such layers together to form a laminate after they have been impregnated with the organic resin binder. In cases where the carbon material is essentially in fiber or similar form, initial shaping can be done in a mold with application of heat and pressure.

Partial or substantial curing of the organic resin binder is typically accomplished by heating the composite to a desired temperature range and maintaining the temperature within that range for a selected period of time. Maintaining the temperature of the composite at approximately 325° F. for up to 10 hours will generally result in substantial curing of the resin. Alternatively the composite can be warm-pressed at temperatures up to 1000° F. under pressure of 500–1,000 psi or more to both precure and carbonize the composite. Thereafter the composite is heated directly to the plastic range in the processes to be described hereafter. This approach decomposes the resin in such a way that relatively large composite articles can be made.

Where initial preparation of the composite is to be accomplished by press-molding, the composite may be placed in a mold and subjected to a relatively high pressure such as 1,000–10,000 psi using a conventional hydraulic press. At the same time the temperature of the composite is raised to a desired level such as 325° F. to effect substantial curing of the resin. Carbon materials in fabric or matte form readily lend themselves to initial processing in a hydroclave or an autoclave. Where a hydroclave is used, the formed laminate is placed on a plate in a vacuum bag which is then secured within the hydroclave and subjected to heat. An autoclave can be used to debulk the composite. In such situations the temperature may be elevated to a value on the order of 180° F. with the pressure being elevated to a value on the order of 300 psi.

Once the composite has been formed, shaped and precured, it is ready for further processing to carbonize the resin, densify the composite and provide the composite with high temperature stability. In accordance with the invention this further processing is accomplished in a single, continuous process using the correct combination of temperature, pressure and time. The process is carried out by continuously heating the composite through different temperature ranges in a non-oxidizing atmosphere while simultaneously applying pressure to the composite. The composite is heated in rapid but controlled fashion through a temperature range at which substantial decomposition of the resin binder takes place. Pressure in the form of compression forces applied to opposite portions of the outer surface of the composite to help prevent delamination and to encourage compaction of the composite. As described hereafter the compression forces comprise forces applied in opposite directions to opposite portions of the outer surface of the composite by use of opposite platens in a hydraulic press. When the resin binder has been substantially decomposed and the danger of delamination thereby reduced, the temperature of the composite is increased rapidly to a point where the composite begins to soften and become plastic. At this point the temperature is increased further so as to provide the composite with a desired amount of softening. Up to this point the composite usually undergoes some compaction due to the heating in the presence of high pressures. However as the composite softens and becomes plastic, the application of pressure in the form of compression forces applied to opposite portions of the outer surface of the composite provides for substantial additional compaction of the composite with a resulting high density. Maintenance of the composite at a high temperature for a selected period of time heat-treats the composite and enhances compaction so as to impart substantial oxidation resistance and desired physical properties to the resulting product.

A typical temperature profile of processes in accordance with the invention in which temperature is plotted as a function of time is shown in FIG. 1. As previously noted the composite is initially shaped and precured prior to carrying out the continuous process in accordance with the invention. The process is begun at a time $T_1$ by applying heat and pressure to the composite. The temperature of the composite is increased from ambient or room temperature at the starting time $T_1$ to an increased temperature at a later time $T_2$. It has been found that for most composites the resin begins to decompose at approximately 400° F. and continues to decompose through temperatures in excess of 1000° F. At about 1000° F. approximately 60% of the decomposition gases and other volatiles have been driven from the composite so that the decomposition is substantial. Within this first temperature range of 400°–1000° F. considerable caution must be exercised to prevent the composite from delaminating or otherwise being damaged. As decomposition gases are formed and escape, such gases tend to create voids within the composite. If generation of the decomposition gases occurs too rapidly, the composite has a tendency to delaminate or otherwise undergo undesirable changes which tend to make it unsuitable. Accordingly a relatively constant rate of temperature increase between the times $T_1$ and $T_2$ may be used so as to provide substantial decomposition of the resin binder at a relatively rapid rate while at the same time avoiding delamination or other damage to the composite. The rate of temperature increase between the times $T_1$ and $T_2$ is a compromise between a desire on the one hand to take the composite through the resin decomposition range as rapidly as possible and on the other hand to prevent harmful effects on the composite. It has been found that the application of high pressure to the composite during the time period $T_1$ through $T_2$ has an effect of tending to produce composites of uniform properties. At the same time the pressure applied to the composite cannot be too great or it may result in breakage of the composite.

The total time required to carry out the continuous process according to the invention is defined by the interval between the times $T_1$ and $T_4$. It has been found that the time interval $T_1$–$T_2$ for taking the composite through the range of substantial resin decomposition is typically on the order of about three-eighths of the total time $T_1$–$T_4$. The actual time required to traverse the interval $T_1$–$T_2$ is dependent on a number of factors including the size of the composite part being made. Larger or thicker parts do not permit the escape of decomposition gases as readily as do smaller or thinner parts, thereby requiring more time to reach the point $T_2$. Where composite parts on the order of 3 to 4 inches in diameter are made, the time interval $T_1$–$T_2$ is typically on the order of 1½–6 hours.

When the time $T_2$ is reached the danger of delamination of the composite is greatly diminished. Accordingly heating of the composite is continued at a second rate which is usually greater than the first rate. Heating of the composite beginning at the time $T_2$ acts to substantially complete carbonization of the resin binder and to at least partially pyrolyze the resin binder as the temperature is increased to values on the order of 3000° F. and then 4000° F. Application of high pressure to the composite is continued so as to compact and densify the composite. Again, however, the pressure cannot be so high as to cause breakage of the composite. Due in part to the presence of the high pressure and to the face that the composite is substantially through the resin decomposition range, the second rate of heating between the points $T_2$ and $T_3$ can be a very high rate. In some cases this rate is as high as the equipment will permit, although something less than the maximum possible rate is often used.

As the composite is heated at the second rate a temperature range is eventually entered in which the composite begins to soften and become plastic. This range may begin at temperatures as low as 3000° F. or less for some composites and may be at considerably higher temperatures for other composites. The degree of softening or plasticity tends to function in direct relation with the temperature of the composite, although a temperature or temperature range is eventually reached beyond which the amount of softening is relatively insignificant. It is when the composite reaches this softened or plastic state that the application of high pressure results in very substantial compaction of the composite so as to greatly increase its density. Accordingly the second rate of temperature increase is continued until a point $T_3$ is reached at which the composite has achieved the desired degree of plasticity for purposes of substantial compaction of the composite. The time period $T_2$–$T_3$ at which the composite is heated at the second rate is typically on the order of about three-eighths of the total time period $T_1$–$T_4$. For the manufacture of composite parts of approximately 3 to 4 inches diameter, the interval $T_2$–$T_3$ is on the order of 2–4 hours.

In the example of FIG. 1 softening of the composite is illustrated as beginning at a temperature slightly in excess of 3000° F. While the composite undergoes some compaction prior to and during the initial stages of softening, it is not until higher temperatures are reached that the degree of softening increases so as to provide significant compaction of the composite in response to the high pressure. Accordingly as the temperature of the composite is increased beyond the initial stages of the softening or plastic range a high densification range is encountered in which the composite undergoes substantial amounts of compaction in response to pressure applied over a period of time. In the example of FIG. 1 high densification begins to occur at temperatures in excess of 4000° F. and is particularly pronounced at temperatures at or in excess of about 5000° F. At the point $T_3$ at which the desired degree of plasticity has substantially been reached, the second rate of temperature increase of the composite is discontinued and enough heat is applied so as to at least maintain or in most cases slightly increase the temperature of the composite as the time interval between $T_3$–$T_4$ is undergone. It is during this interval that the composite undergoes substantial compaction in response to the high pressure applied thereto. Continued heating in the presence of high pressure greatly increases the density of the composite and thus the resistance to oxidation at high temperatures. The interval $T_3$–$T_4$ is typically on the order of about two-eighths of the total interval $T_1$–$T_4$. Where composite parts having a diameter on the order of 3 to 4 inches are made, the interval $T_3$–$T_4$ is typically on the order of 1½–4 hours.

In the example of FIG. 1 the second rate of heating of the composite is terminated just prior to reaching the point $T_3$ where the temperature is on the order of 5000° F. During the interval $T_3$–$T_4$ the temperature of the composite is increased to and then maintained at approximately 5500° F. At the time $T_4$ the single step process is completed. Pressure is removed from the composite as it cools to ambient temperature. At this point further processing of the composite to enhance the density and high temperature stability thereof is unnecessary.

The temperature profile of FIG. 1 has been shown and described for purposes of example only, and other profiles are possible in accordance with the invention. For example profiles which are generally linear or which comprise a continuous curve may be advantageous for certain applications of the invention.

As noted in connection with FIG. 1 the composite is subjected to high pressures during the entire interval $T_1$–$T_4$. During the interval $T_1$–$T_2$ the pressure must be high enough to discourage or prevent delamination or other damage to the composite. During the interval $T_2$–$T_3$ the pressure should be high enough to promote some compaction of the composite, but at the same time cannot be so high as to break the composite. During the interval $T_3$–$T_4$ where the danger of breakage of the composite is greatly lessened, high values of pressure are desired to maximize compaction of the composite and densification of the resulting part.

Figure 2A:
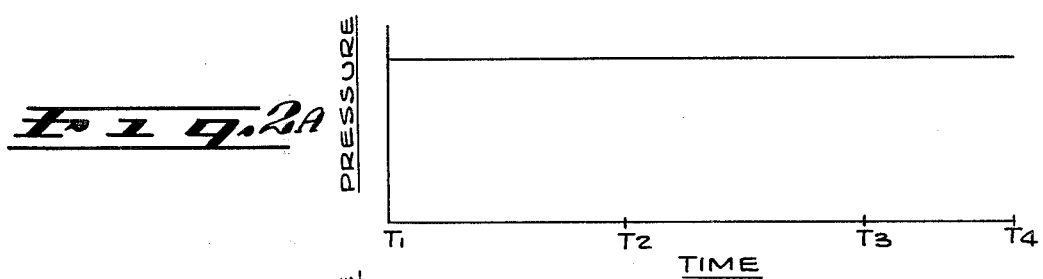
FIGS. 2A–2C are diagrammatic plots of pressure as a function of time comprising typical pressure profiles used in processes according to the invention.
Figure 2B:
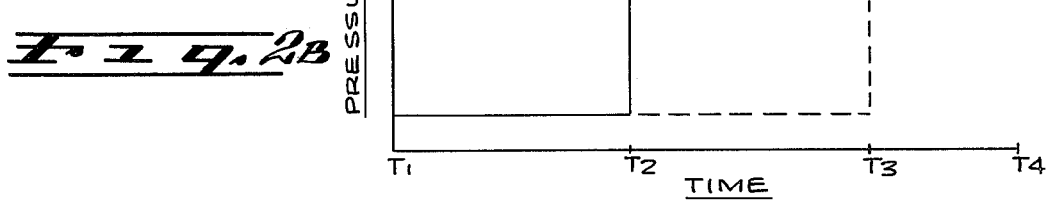
Figure 2C:
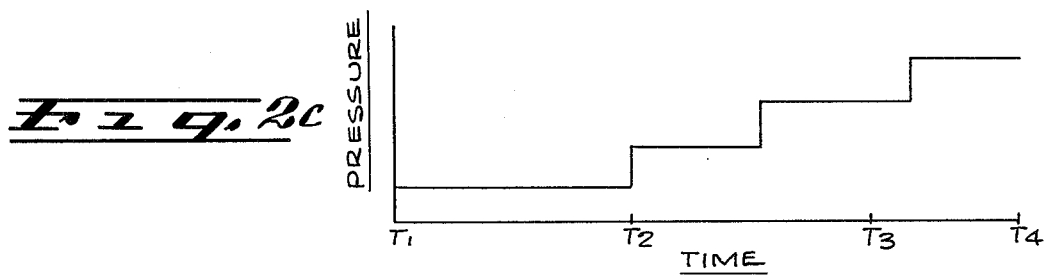

Different pressure profiles have been used in accordance with the invention with somewhat different results as shown in the examples described hereafter. Three typical pressure profiles are shown in FIGS. 2A, 2B and 2C. In the profile of FIG. 2A the pressure is maintained at a substantially constant value during the entire interval $T_1$–$T_4$. In the pressure profile of FIG. 2B the pressure is initially established at a first level and maintained relatively constant. At about the time $T_2$ the pressure is increased to a much higher level where it is maintained relatively constant through the times $T_3$ and $T_4$. In a variation of this profile shown in dashed outline in FIG. 2B the initial pressure level is maintained through the region of $T_3$ where it is increased to the higher level. In the pressure profile of FIG. 2C the pressure is again established at a substantially constant low level through the region of $T_2$. Thereafter the pressure is stepped up to increasingly higher levels until a maximum level is reached during the latter part of the interval $T_3$–$T_4$.

Figure 3:
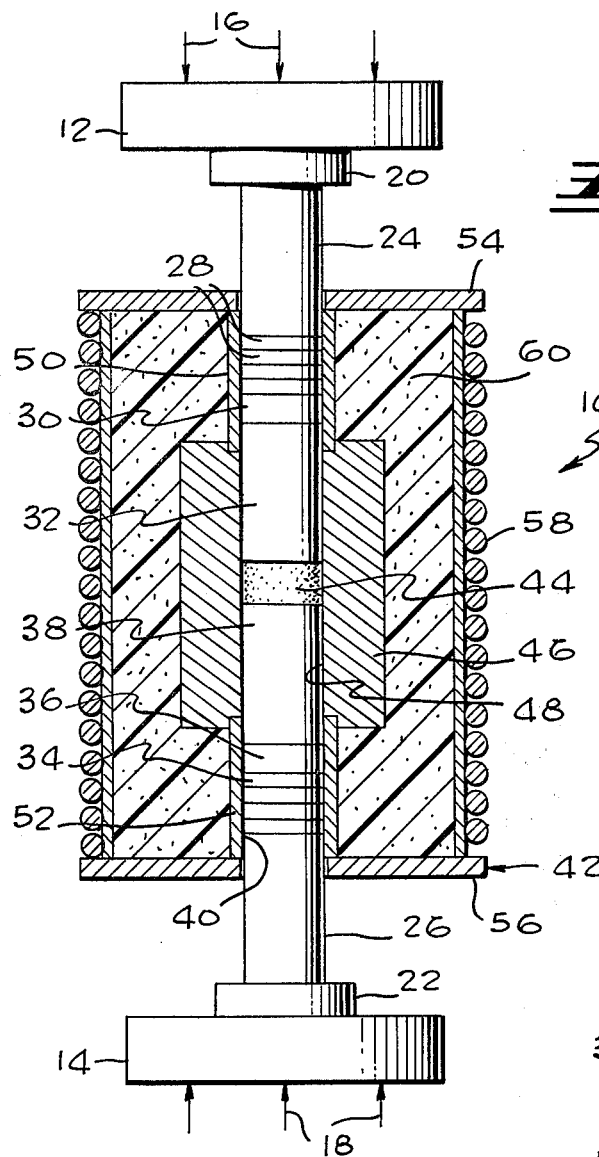
FIG. 3 is a cross-sectional view of an electric induction furnace arrangement utilized for carrying out processes in accordance with the invention.

FIG. 3 shows an induction furnace arrangement 10 for carrying out processes in accordance with the invention. The arrangement 10 includes the opposite platens 12 and 14 of a conventional hydraulic press. The platens 12 and 14 are capable of exerting selected amounts of force toward one another as shown by the arrows 16 and 18. The platens 12 and 14 are provided with pusher plates 20 and 22 respectively for mounting a pair of opposite water cooled punches 24 and 26 respectively. The punch 24 includes a plurality of pyrolytic graphite insulation plates 28, a graphite pusher plate 30 disposed on the opposite side of the insulation plates 28 from the pusher plate 20 and a graphite punch 32 disposed adjacent the pusher plate 30. The water cooled punch 26 is similarly provided with a plurality of insulation plates 34, a pusher plate 36 and a graphite punch 38.

The water cooled punches 24 and 26 which are generally cylindrical in shape extend into the opposite ends of a generally cylindrical aperture 40 of an induction furnace 42 so as to apply pressure to the opposite flat surfaces of a composite part 44 being made. In the present example the composite part 44 is shown as being generally cylindrical or disk-shaped, although it should be understood that the formation of parts having many different shapes is possible in accordance with the invention.

The induction furnace 42 includes a susceptor die 46 having a generally cylindrical aperture 48 therein which forms a part of the aperture 40. The walls of the aperture 48 contact the circumferential outer surface of the composite part 44 to restrain expansion of the part 44 as pressure is applied to the part by the punches 32 and 38. The aperture 48 of the die 46 also receives the punches 32 and 38 in sliding relation. A pair of hollow, generally cylindrical die supports 50 and 52 extend from the opposite ends of the die 46 to form the remainder of the aperture 40. The die supports 50 and 52 are coupled to opposite end plates 54 and 56 respectively to define a generally cylindrical shape for the furnace 42. An induction coil 58 is wound around the outside of the furnace 42, and insulation 60 is disposed between the coil 58 and the outsides of the die 46 and the die supports 50 and 52.

In the fabrication of composite parts in accordance with the invention, each part such as the part 44 is first formed, shaped and precured in a manner such as previously described. The part 44 is then placed within the die 46 and the punches 24 and 26 are inserted into the opposite ends of the aperture 40 in the furnace 42. The continuous process in accordance with the invention is then begun by setting the hydraulic press to apply the desired initial pressure to the composite part 44 via the platens 12 and 14 and the included punches 24 and 26. At the same time current is applied to the induction coil 58 to begin heating of the composite part 44. Pressure and temperature gauges (not shown) are employed to provide indications of the pressure being applied to the composite part 44 and the temperature of the part 44.

The power required to effect heating of the composite part 44 via the induction coil 58 depends on a number of factors including the size of the part 44. Larger parts require more power to effect the necessary heating. Thus while an induction furnace having a 50 KW capacity will suffice for composite parts of 3-4 inches diameter, a 250 KW furnace is typically required for making parts 1-2 feet in diameter or in the largest dimension.

With the continuous process according to the invention begun, sufficient electrical power is applied to the induction coil 58 as a function of time so as to raise the temperature of the composite part 44 from ambient to approximately 1000° F. As the decomposition range for the resin binder is passed through, some expansion and contraction of the composite part 44 will be observed. Typically, the part 44 undergoes some expansion during the first part of the decomposition temperature range followed by contraction and then some compaction as the latter part of the temperature range is traversed and 1000° F. is reached. The initial expansion results from heating of the composite part 44 without consequent compaction of the part. As the temperature continues to increase, however, the continued decomposition of the resin binder results in compaction of the part to an extent which is usually greater than the tendency of the part to expand in response to the increasing temperatures. Volatiles and other decomposition gases from the composite part 44 leave the part 44 and travel upwardly along the punch 24, eventually escaping from the top of the furnace 42. Expansion and compaction of the composite part 44 are observed as relative movements of the platens 12 and 14. Measurement of platen movement provides an accurate measurement of compaction of the composite part 44.

When the temperature of the composite part 44 has increased to approximately 1000° F. the electrical power applied to the induction coil 58 is selected to provide continued heating of the composite part 44 to the point where the part begins to soften. If the pressure is to be increased at this point or at any other point in the process, appropriate adjustments are made to the hydraulic press driving the platens 12 and 14. As the composite part 44 is heated to increasingly higher temperatures, some platen movement will typically be observed indicating that the part 44 is undergoing some compaction. However entry of the part 44 into the plastic temperature range is usually signaled by a pronounced relative movement of the platens 12 and 14. From this point on, the platens will typically be observed to undergo substantial relative movement indicating substantial compaction and densification of the part 44 as the part 44 is maintained within the plastic temperature range and pressure is continually applied to the part 44. The electrical power applied to the induction coil 58 is varied with time as necessary to gradually increase the temperature of the composite part 44 to a maximum temperature during the interval $T_3$–$T_4$.

When the point $T_4$ is reached the electrical power being applied to the induction coil 58 is removed, allowing the part 44 to cool, and the hydraulic press is adjusted to decrease the pressure applied to the part 44 until eventually only ambient pressure remains. The composite part 44 is then removed from the furnace 42 and is considered complete to the extent that it is a carbon-carbon composite in which the resin binder has been carbonized, in which the density has been substantially increased and in which the thermal stability is greatly improved.

The continuous process in accordance with the invention should be carried out in a non-oxidizing atmosphere, particularly when the temperatures begin to exceed 500° F. As a practical matter it has been found that when the induction furnace arrangement 10 of FIG. 3 is used, the escaping volatiles maintain the atmosphere in the immediate vicinity of the part 44 sufficiently oxygen-free. This is true from temperatures below 500° F. to temperatures well in excess of 1000° F. At higher temperatures oxygen is not present in sufficient quantities to pose problems. In some situations, however, it may be desirable or necessary to introduce an inert gas into the region of the composite to maintain the atmosphere at a desirable non-oxidizing level.

The induction furnace arrangement 10 is shown and described by way of example only, and it should be understood that other arrangements can be used to carry out processes according to the invention. Also pressure application need not be effected by a double acting hydraulic press, as described, and instead other appropriate apparatus can be used including a single acting press as well as presses of the mechanical type.

Figure 4:
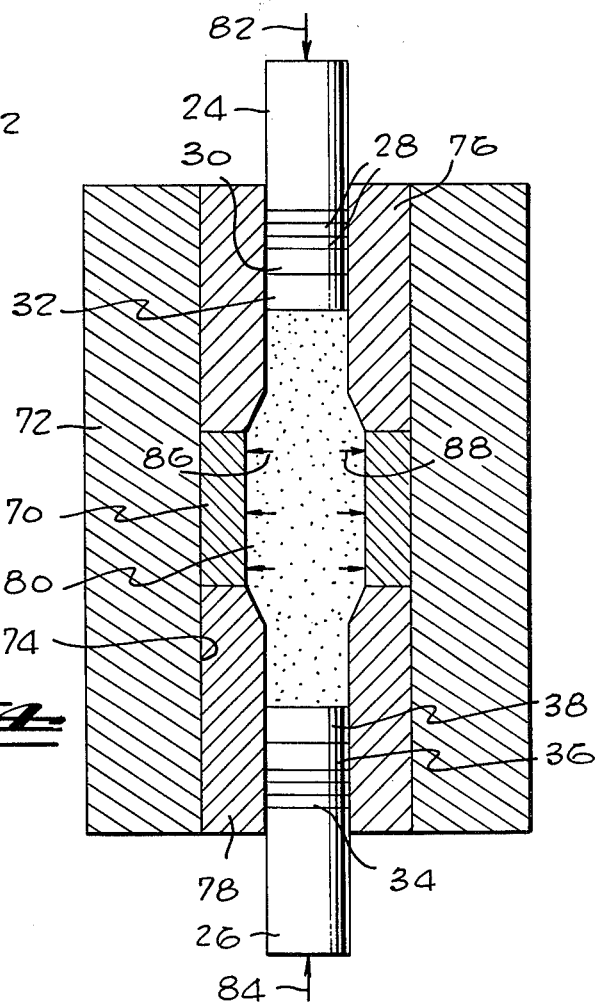
FIG. 4 is a cross-sectional view of a portion of an electric induction furnace arrangement similar to FIG. 3 and illustrating the manner in which hollow composite parts can be made in accordance with the invention.

The induction furnace arrangement of FIG. 3 is described in terms of the manufacture of a solid composite part 44. Where composite parts of hollow configuration are to be made, the arrangement shown in FIG. 4 may be used. The arrangement of FIG. 4 depicts a composite part 70 which is of hollow, generally cylindrical shape for purposes of the present example but which can assume other hollow shapes in accordance with the invention. In the arrangement of FIG. 4 a generally cylindrical die 72 has a generally cylindrical aperture 74 therein, the walls of which contact the outer circumferential surface of the composite part 70. A pair of hollow, generally cylindrical dies 76 and 78 are disposed within the aperture 74 within the die 72 on opposite sides of the part 70 so as to abut the opposite surfaces of the part 70 and form cylindrical apertures for slidably receiving the water cooled punches 24 and 26.

In the arrangement of FIG. 4 the hollow interior of the composite part 70 is filled with a pressure transmitting powder 80. The powder 80 also extends between the opposing punches 32 and 38 so as to receive the force exerted by the punches 24 and 26 as shown by the arrows 82 and 84. The powder 80 acts as a pressure transmitting fluid to convert the force exerted by the punches 32 and 38 into a radially outwardly directed pressure as shown by arrows 86 and 88. The dies 72, 76 and 78 restrain the composite part 70 against outward movement while the powder 80 exerts the desired pressure on the inside surface of the part. The process used with the arrangement of FIG. 4 is carried out in the same way as with the arrangement of FIG. 3. The powder 80 may be comprised of carbon powder or graphite powder.

While use of a pressure transmitting powder lends itself to fabrication of parts having hollow interiors, the powder can also be used to apply pressure to the outside of a part being formed. For example portions of the part can be confined by a die with the powder 80 being used to apply uniform pressure to remaining portions of the outside of the part.

FIGS. 5–15 provide eleven different examples of processes in accordance with the invention. The composites of FIGS. 5–11 were of identical composition and measured approximately 3 inches across. Each of the composites in the examples of FIGS. 5–11 had a total weight which was comprised of 36.3% resin, 15.0% carbon filler and 48.7% carbon fabric. The resin was of the phenolic type; specifically a resin sold as "No. USP 39" by U.S. Polymeric of Santa Ana, Calif. The filler comprised carbon black. The fabric comprised square weave graphite fabric. The examples of FIGS. 12–15 involved like composites, which composites were different from the composites of FIGS. 5–11 except for size. The total weight of each of the composites of FIGS. 12–15 was comprised of 34.9% resin, 15.0% carbon filler and 50.1% carbon fabric. The resin was of the phenolic type and comprised No. USP 39 resin of U.S. Polymeric. The filler was carbon black. The fabric was eight harness satin fabric, woven using high modulus graphite yarns.

Figure 5:
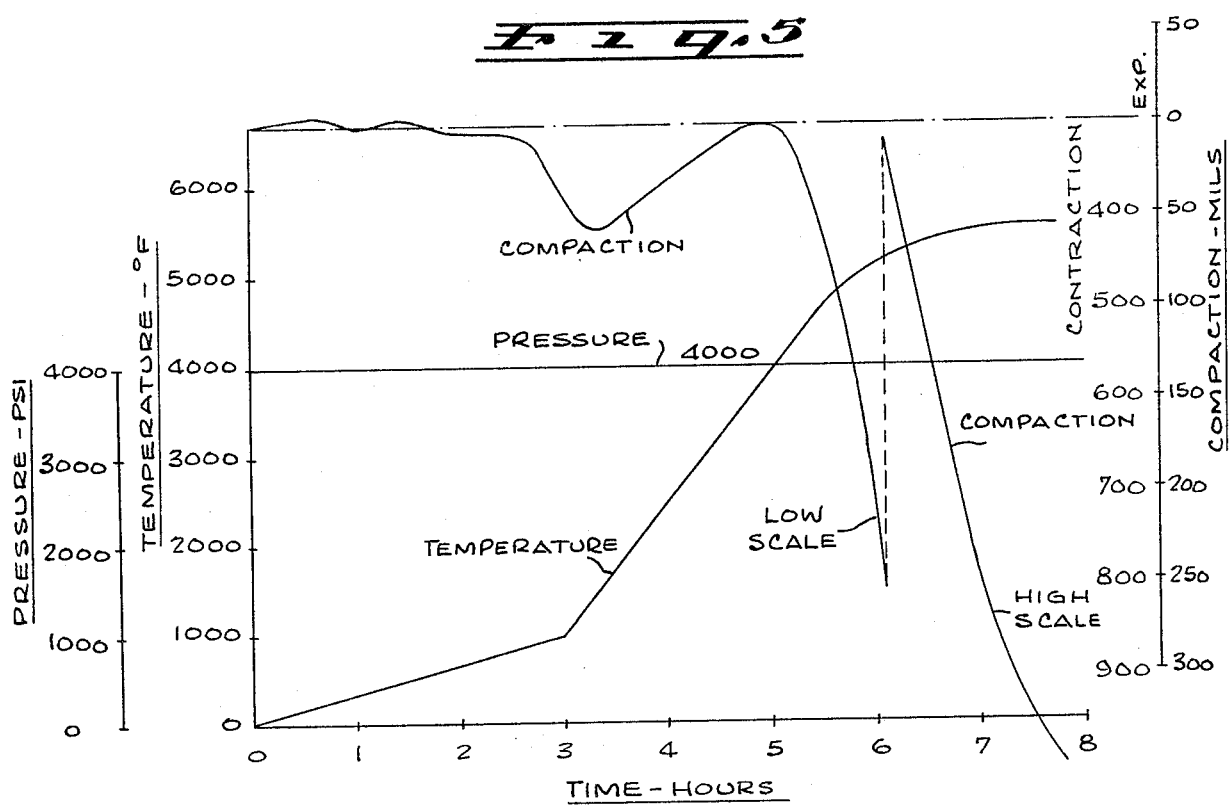

In the example of FIG. 5 a temperature profile similar to that of FIG. 1 was extended over a period of eight hours in the presence of a constant pressure of 4000 psi. As will be seen from FIG. 5 the composite underwent a small amount of compaction as the temperature began to increase at the second rate, then expanded back to its initial volume, then underwent considerable compaction as the softening point of the composite was reached.

Figure 6:
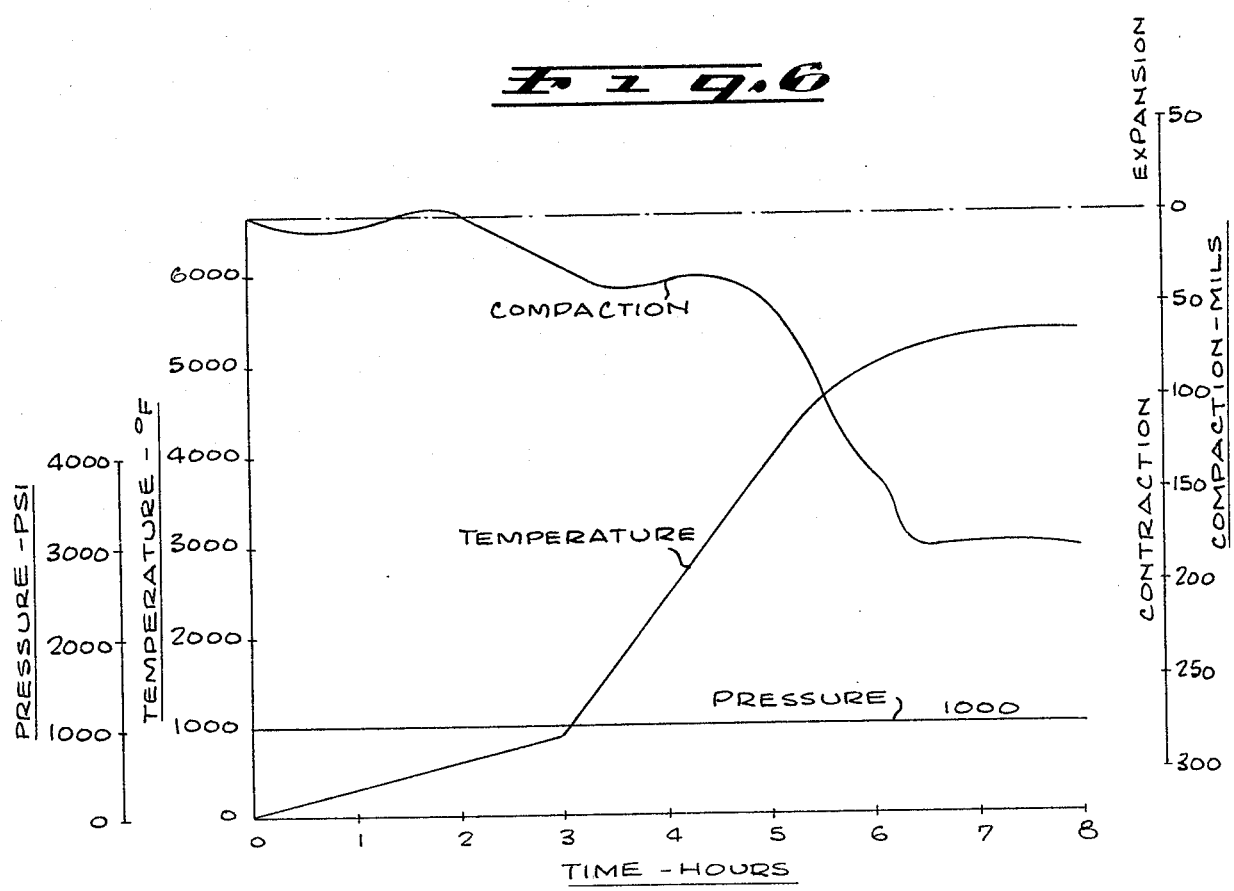

In the example of FIG. 6 a composite identical to that used in FIG. 5 was subjected to the same eight hour temperature profile, but in the presence of a constant pressure of 1000 psi. As seen in FIG. 6 the composite underwent a small amount of compaction in the early stages of the second temperature rate, then underwent further compaction as the plastic range was reached.

Figure 7:
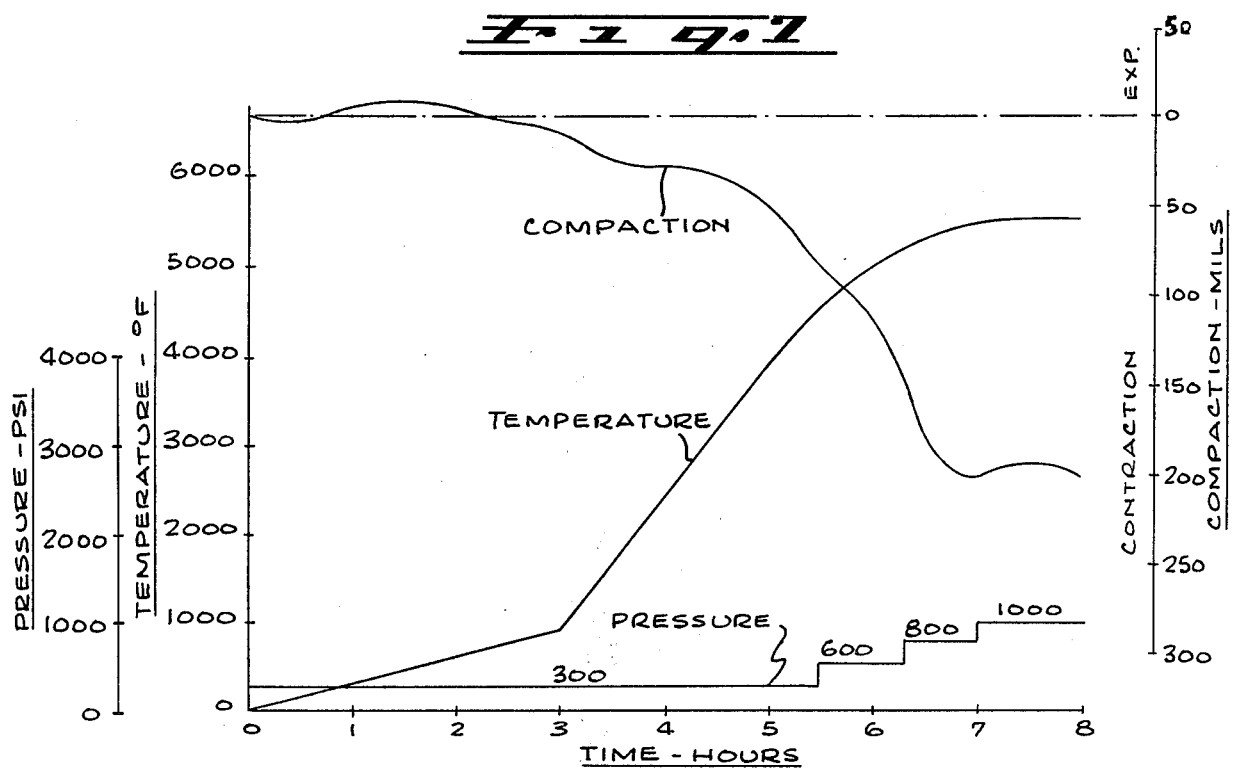

In the example of FIG. 7 a composite identical to those used in FIGS. 5 and 6 was subjected to the same eight hour temperature profile, but in the presence of a pressure which was stepped from a minimum of 300 psi to a maximum of 1000 psi. The pressure of 300 psi was maintained until the plastic range was reached, following which the pressure was stepped up to 600 psi, then 800 psi and then 1000 psi. It will be noted that the composite underwent a small amount of compaction as the second heating rate was begun, with the compaction increasing considerably as the plastic range was reached and the pressure increased.

Figure 8:
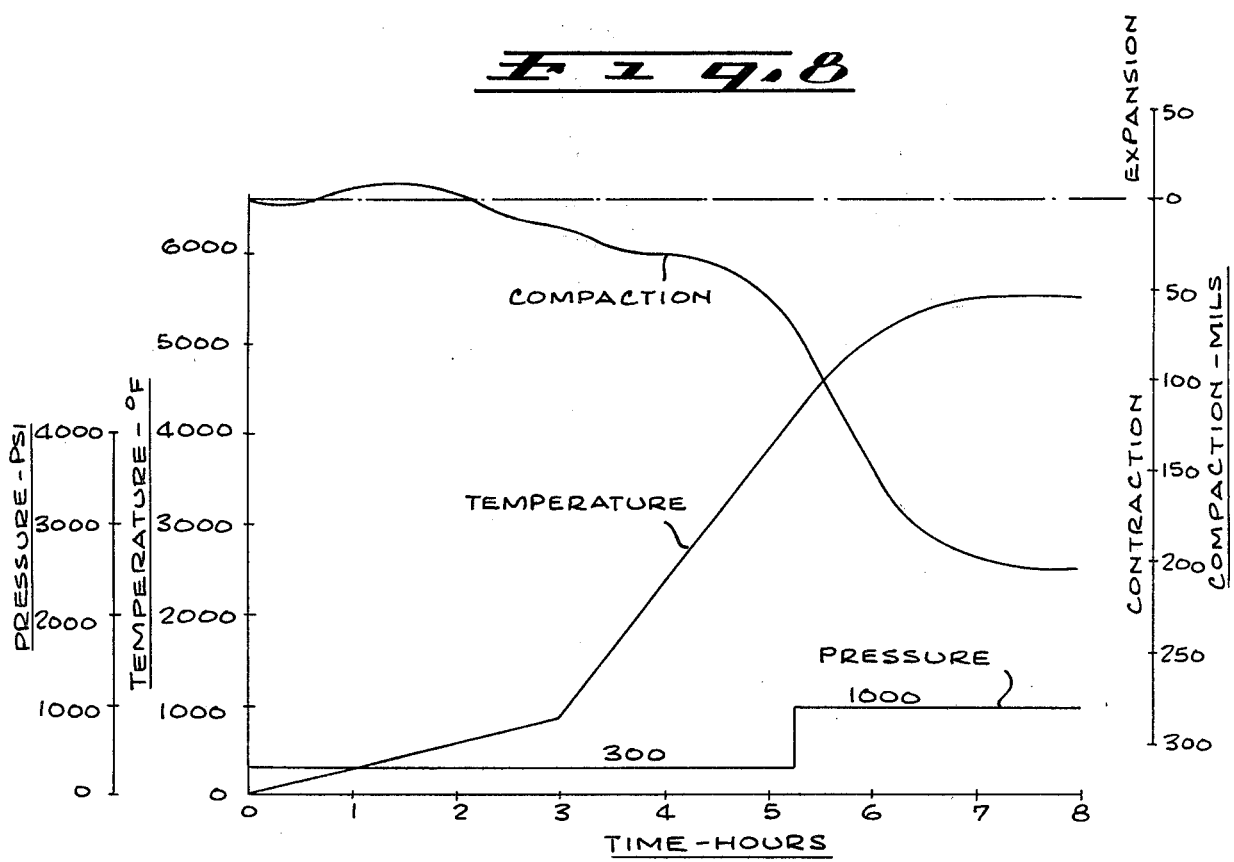

In the example of FIG. 8 the same eight hour temperature profile was maintained, but the pressure was maintained at 300 psi until the plastic range was reached and was then increased to a constant 1000 psi. The composite underwent some compaction as the second rate of temperature increase was begun, which compaction increased as the plastic range was reached.

Figure 9:
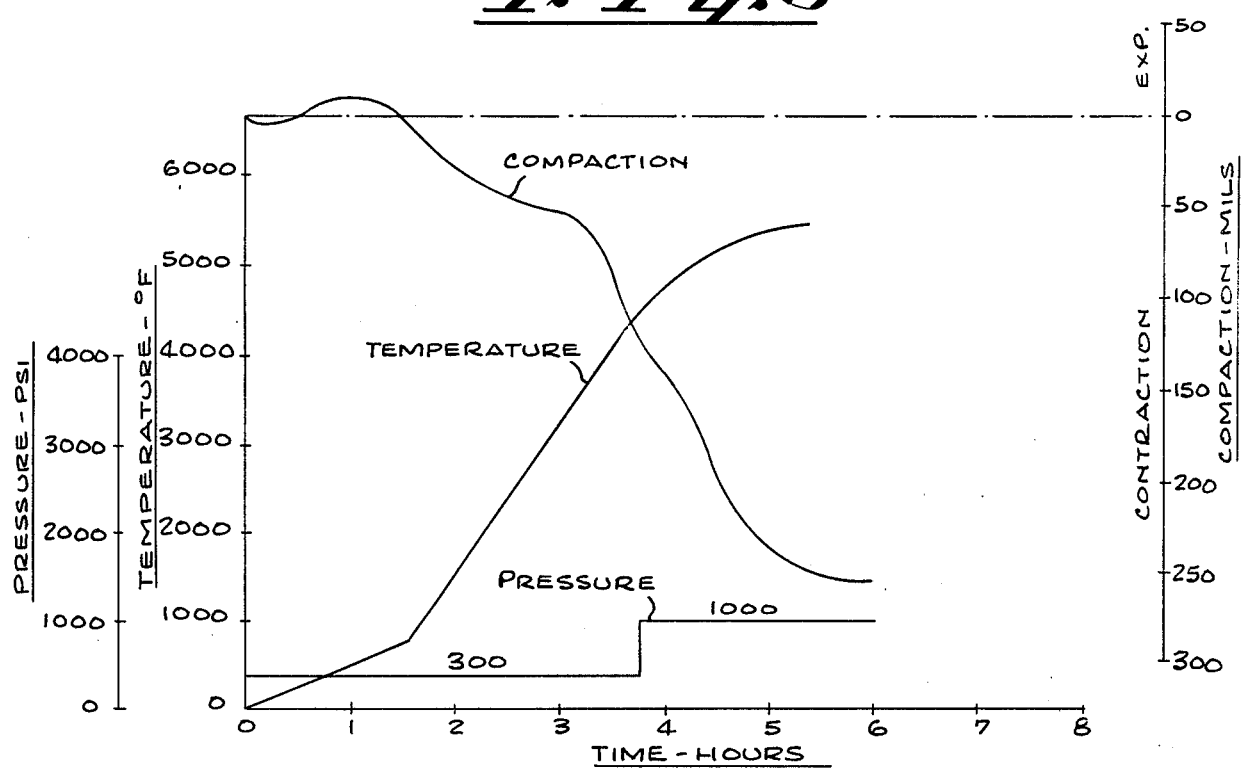

In the example of FIG. 9 the temperature profile of FIG. 1 was maintained but the process was shortened to 6 hours. The pressure was maintained at a constant 300 psi until the plastic range was reached, then increased to a constant 1000 psi. Again, the composite underwent some compaction during the second rate of temperature increase, which compaction increased even more as the plastic range was entered.

Figure 10:
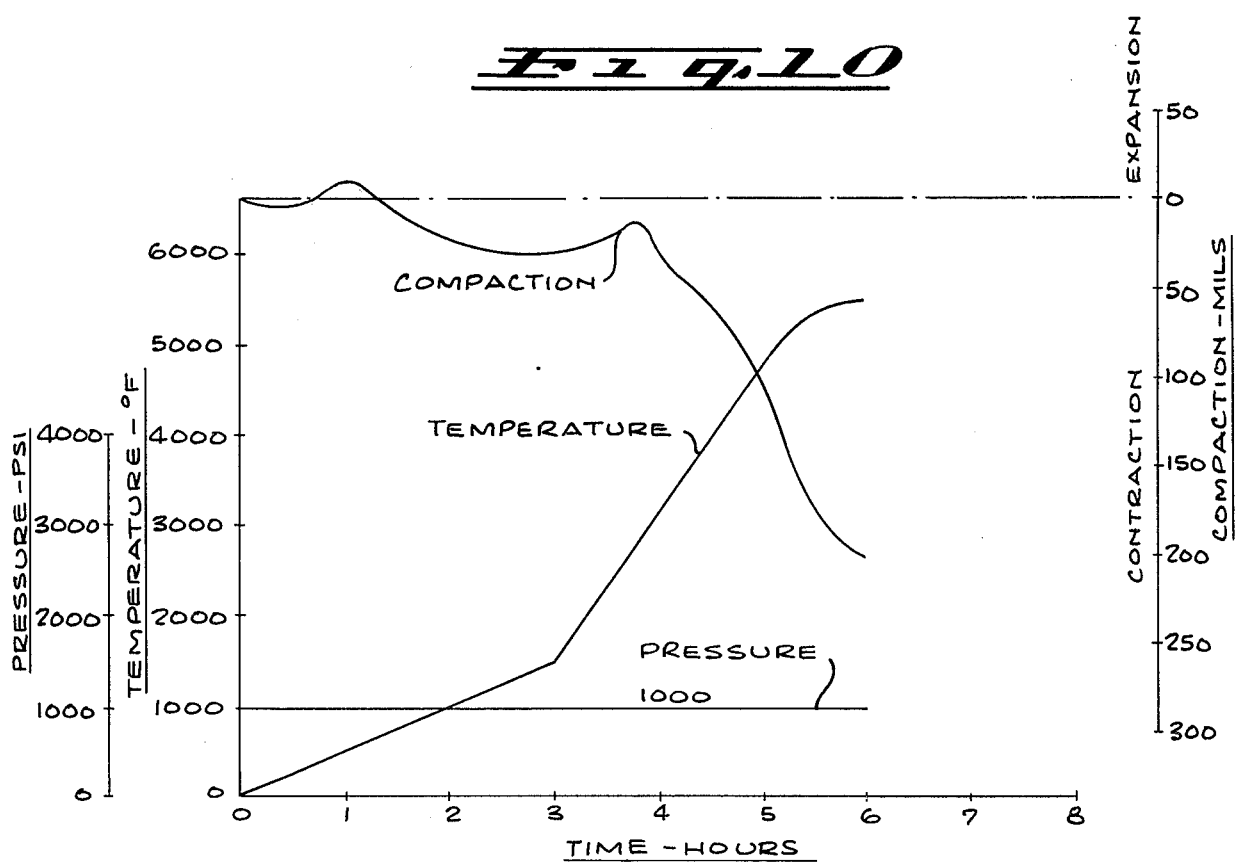

The example of FIG. 10 used the same temperature profile as FIG. 1 but lengthened the process to 12 hours. The pressure was maintained at a constant 1000 psi during the twelve hour process. The composite underwent a small amount of compaction toward the end of the first rate of temperature increase and the beginning of the second rate of temperature increase, following which the compaction increased as the plastic range was entered.

In the example of FIG. 11 the process was again shortened to six hours, and the pressure was maintained at a constant 4000 psi. As shown, the compaction increased significantly as the second rate of temperature increase was begun, then reversed for awhile, then increased substantially as the plastic range was entered.

The measured properties of the composites made in the examples of FIGS. 5–11 were as follows:

TABLE I

Figure 11:
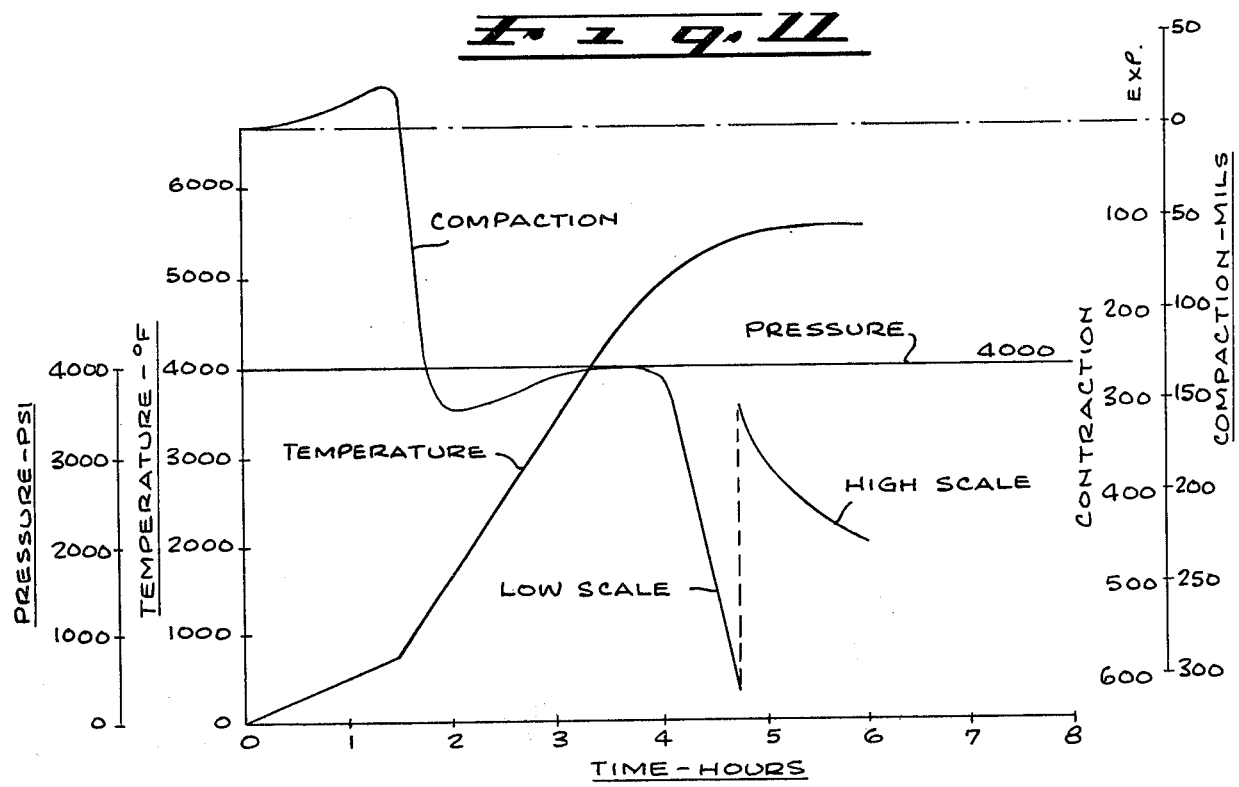

| EXAMPLE | FIG. 5 | FIG. 6 | FIG. 7 | FIG. 8 | FIG. 9 | FIG. 10 | FIG. 11 |
|---|---|---|---|---|---|---|---|
| INITIAL DENSITY (g/cc) | 1.41 | 1.41 | 1.42 | 1.41 | 1.41 | 1.41 | 1.41 |
| COMPACTION (%) | 45.3 | 32.4 | 27.8 | 31.7 | 27.2 | 30.6 | 46.5 |
| WEIGHT LOSS (%) | 21.6 | 19.9 | 20.5 | 20.3 | 20.1 | 19.8 | 24.1 |
| FINAL DENSITY (g/cc) | 1.81 | 1.65 | 1.55 | 1.64 | 1.54 | 1.62 | 1.80 |
| TENSILE STRENGTH (lb/in$^2$) | 11,058 | 9162 | 7271 | 7800 | 7178 | 8245 | 8973 |
| TENSILE MODULUS ($10^{-6}$ lb/in$^2$) | 3.1 | 2.4 | 2.0 | 2.1 | 1.7 | 2.0 | 3.2 |
| SHEAR STRENGTH (lb/in$^2$) | 1167 | 1236 | 898 | 951 | 792 | 1064 | 1370 |
| COMPRESSIVE STRENGTH (lb/in$^2$) | 8938 | 7255 | 5009 | 6132 | 4953 | 6563 | 7148 |

It will be seen from the data of TABLE I that the composites of FIGS. 5–11 underwent compaction ranging from a low value of 27.2% to a high value of 46.5%. The weight loss ranged from a low value of 19.8% to a high value of 24.1%. In each example the composite had an initial density of 1.41 or 1.42 g/cc. However the final densities ranged from a low value of 1.54 g/cc to a high value of 1.81 g/cc.

The tensile strengths of the completed composites of FIGS. 5–11 ranged from 7178 lb/in$^2$ to 11058 lb/in$^2$. The final tensile modulus ranged from $2.0 \times 10^{-6}$ lb/in$^2$ to $3.2 \times 10^{-6}$ lb/in$^2$. The shear strength ranged from 792 lb/in² to 1370 lb/in². The compressive strength ranged from 4953 lb/in² to 8938 lb/in².

As noted above a different composite from that used in the examples of FIGS. 5-11 was used in the examples of FIGS. 12-15.

Figure 12:
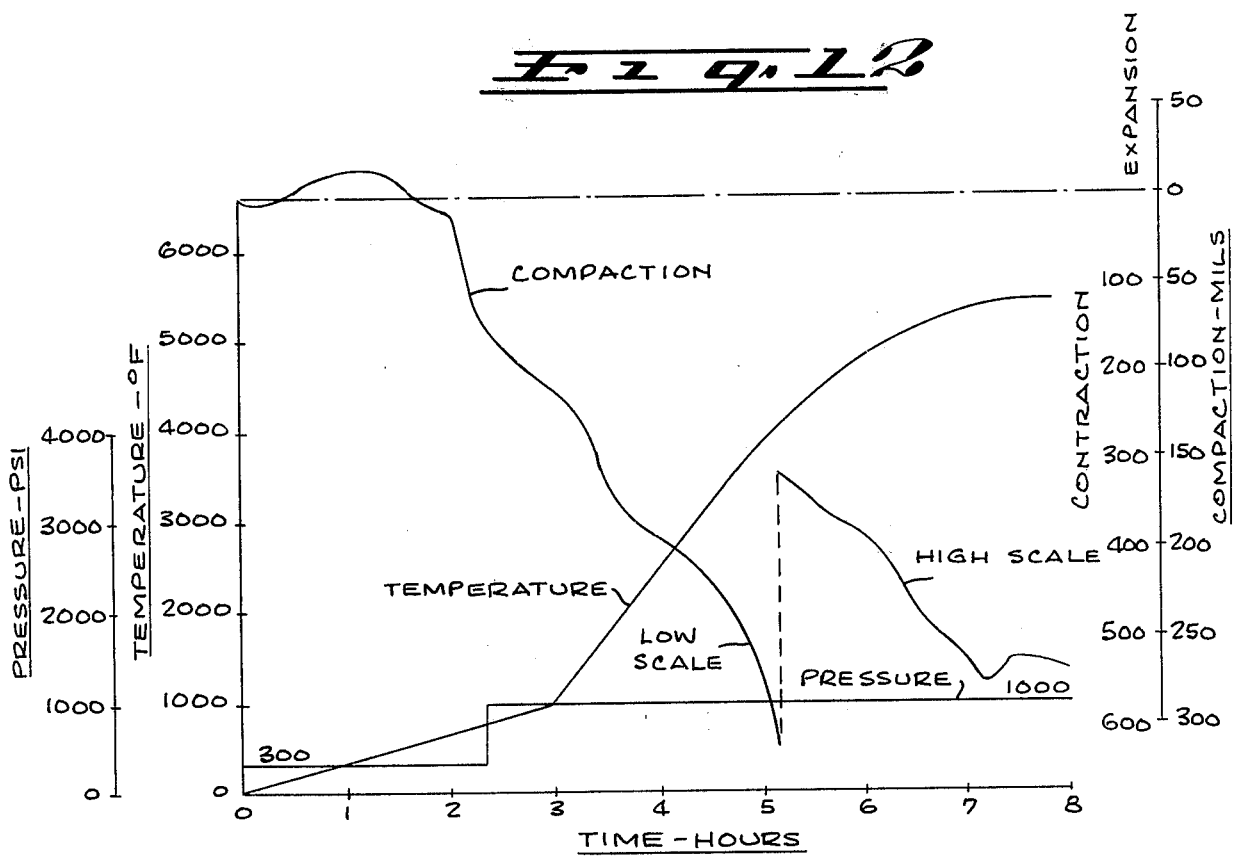

In the example of FIG. 12 an eight hour temperature profile was used, and the pressure was maintained at a constant 300 psi until the temperature reached approximately 750° F. and then increased to and maintained at 1000 psi. It will be seen that the composite began to undergo substantial compaction at the beginning of the decomposition temperature range, which compaction continued until the beginning of the plastic range was reached and then increased still further.

Figure 13:
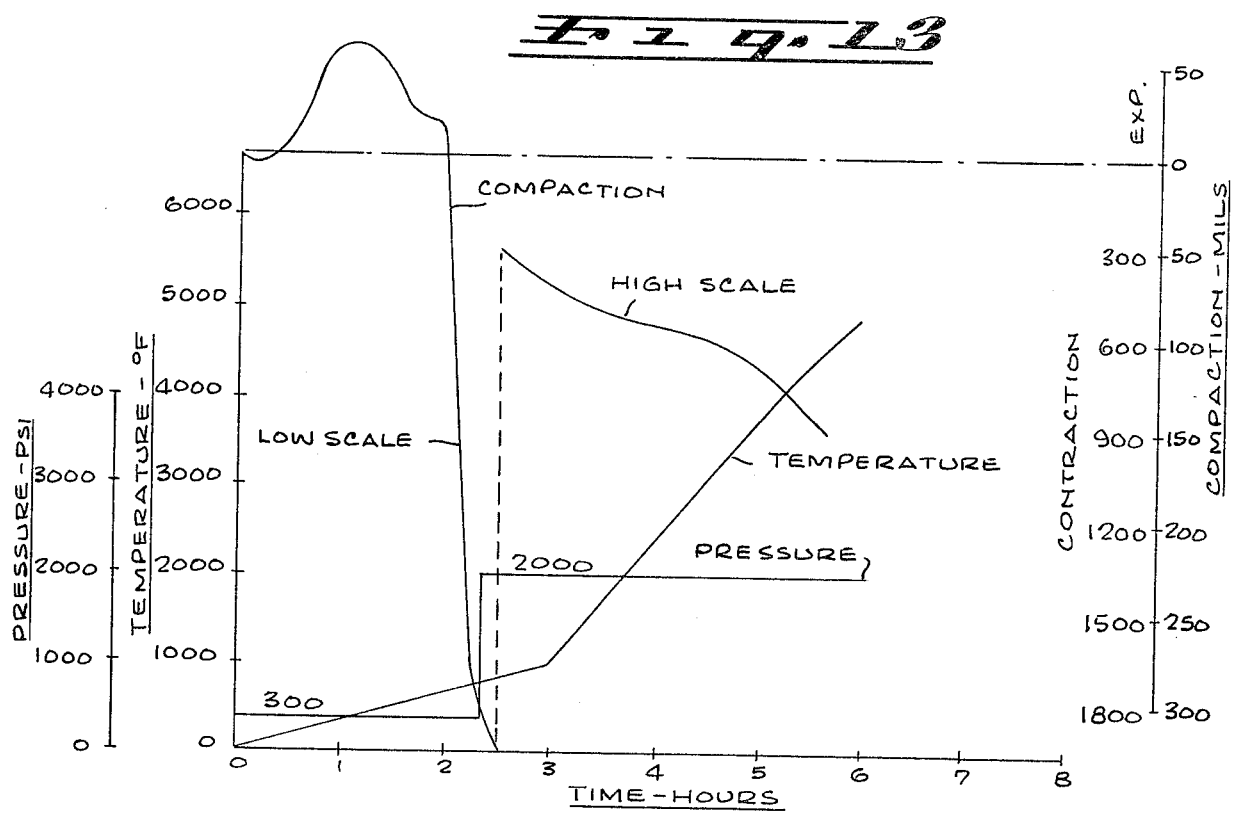

In the example of FIG. 13 the process was shortened to six hours by terminating the process shortly after the plastic range was reached. The pressure was maintained at a constant 300 psi until the complete temperature reached approximately 650° F., and was then increased to a constant 2000 psi. It will be seen that at about 600° F. the composite began undergoing substantial compaction, which compaction continued during the remainder of the process.

Figure 14:
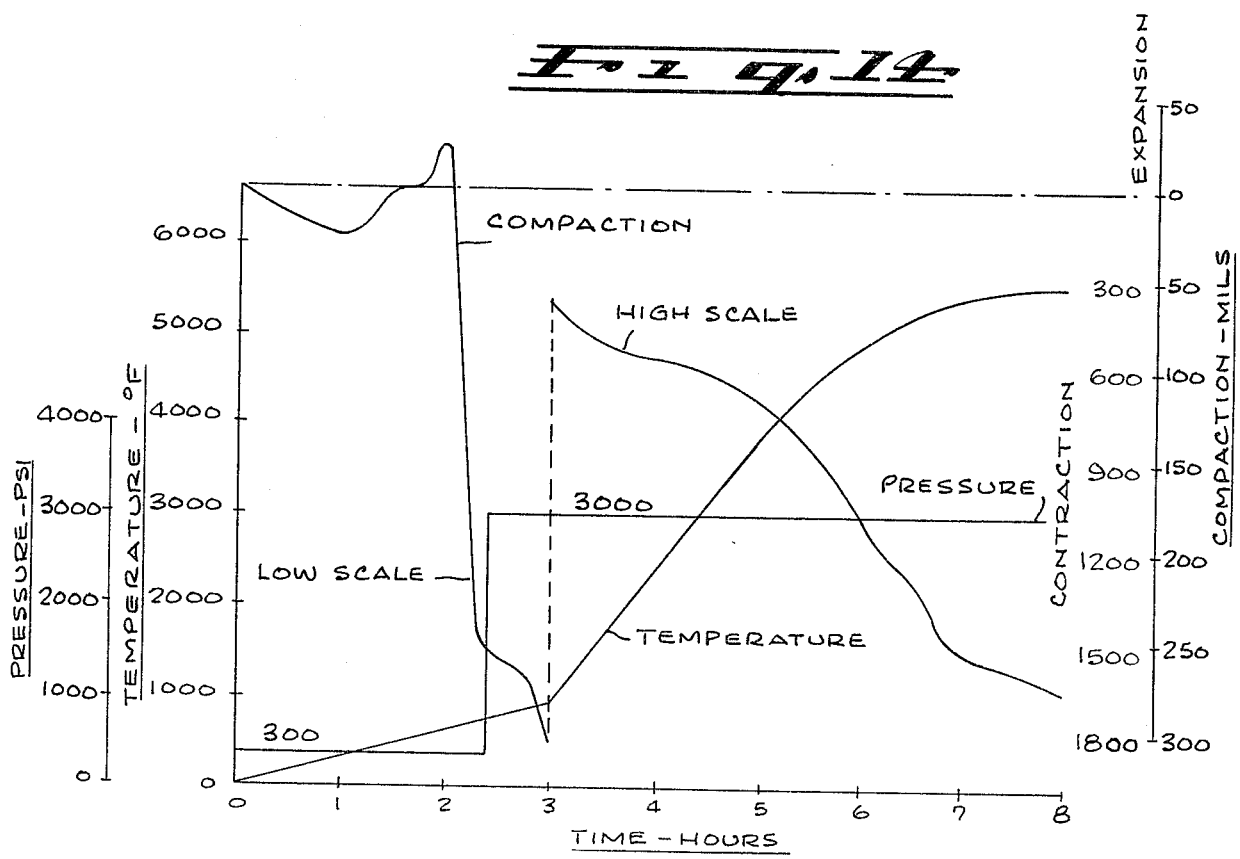

In the example of FIG. 14 an eight hour temperature profile was used in the case of FIG. 12. The pressure was maintained at 300 psi until the composite temperature reached approximately 650° F., then was increased to 3000 psi for the remainder of the process. The composite began to undergo substantial compaction at approximately 600° F., which compaction continued through the remainder of the process.

In the example of FIG. 15 an eight hour temperature profile was used. The pressure was maintained at 300 psi until the composite temperature reached approximately 650° F., then was increased to 4000 psi for the remainder of the process. The composite began to undergo substantial compaction at about 625° F., which compaction increased considerably as the plastic range was entered.

Properties measured from the composites produced by the examples of FIGS. 12 through 15 were as follows:

TABLE II

| EXAMPLE | FIG. 12 | FIG. 13 | FIG. 14 | FIG. 15 |
|---|---|---|---|---|
| INITIAL DENSITY (g/cc) | 1.53 | 1.53 | 1.53 | 1.54 |
| COMPACTION (%) | 31.4 | 35.8 | 39.8 | 42.6 |
| WEIGHT LOSS (%) | 21.1 | 20.9 | 20.1 | 20.3 |
| FINAL DENSITY (g/cc) | 1.75 | 1.83 | 1.94 | 2.00 |
| TENSILE STRENGTH (lb/in²) | 22,680 | 29,008 | 29,961 | 26,329 |
| TENSILE MODULUS ($10^{-6}$ lb/in²) | 24.1 | 30.0 | 26.1 | 27.9 |
| SHEAR STRENGTH (lb/in²) | 1252 | 860 | 426 | 536 |
| COMPRESSIVE STRENGTH (lb/in²) | 15,008 | 14,883 | 15,221 | 15,382 |

It will be observed from the data of TABLE II that the compaction in the examples of FIGS. 12-15 ranged from a low value of 31.4% to a high value of 42.6%. The weight loss ranged from a low of 20.1% to a high of 21.1%. The initial density of the composites was 1.53 or 1.54 g/cc. The final densities ranged from 1.75 g/cc to 2.00 g/cc.

In the examples of FIGS. 12-15 the tensile strengths ranged from 22,680 lb/in² to 29,961 lb/in². The tensile modulus ranged from $24.1 \times 10^{-6}$ lb/in² to $30.0 \times 10^{-6}$ lb/in². The shear strength ranged from a low value of 426 lb/in² to a high value of 1252 lb/in². The compressive strength ranged from a low value of 14,883 lb/in² to a high value of 15,382 lb/in².

The examples of FIGS. 5-15 were chosen from many different processes performed in accordance with the invention to illustrate typical process parameters and composite materials and the results obtained thereby. The examples not only illustrate the differences in results when the same composite material is subjected to different processing parameters, but also serve to illustrate the differences which can occur when different composite materials are subjected to the same or similar treatment. Moreover, for each composite material of given size and shape certain changes in the processing parameters maximize some of the properties of the end product while minimizing other properties, so that compromises are sometimes dictated by the desired results. Accordingly it will be understood that the examples of FIGS. 5-15 are in fact nothing more than examples and that other materials and process parameters can be used in accordance with the invention.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A method of making a high density carbon-carbon composite comprising the steps of:
    forming a laminate of organic resin impregnated layers of carbon material;
    at least partially curing the organic resin;
    heating the laminate while applying forces to opposite portions of an outer surface thereof through a temperature range to substantially decompose the resin, said heating occurring at a first rate which provides relatively rapid decomposition of the resin without accompanying delamination of the laminate; and
    thereafter continuing to heat the laminate at a second rate greater than the first rate and not less than about 1500° F./hr. while applying forces to opposite portions of an outer surface thereof to a temperature higher than said temperature range and at least high enough to provide substantial softening of the laminate.

2. The invention defined in claim 1, wherein the step of continuing to heat the laminate includes maintaining the laminate at temperatures at least high enough to provide substantial softening of the laminate for a period of time sufficient to provide a desired amount of densification of the laminate.

3. A method of making a high density carbon-carbon composite from a composite of carbon material and an organic resin binder comprising the steps of:
    forming the composite into a desired shape having an outer surface;
    at least partially curing the resin binder; and
    continuously heating the composite at a first rate through a first temperature range in which the resin binder undergoes substantial decomposition and carbonization and at a second rate different from the first rate and not less than about 1500° F./hr. into a higher second temperature range in which the composite becomes plastic while simultaneously applying pressure in the form of forces applied to opposite portions of the outer surface of the composite during at least that portion of the step of continuously heating in which the composite is heated into the higher second temperature range to compact and substantially densify the composite.

4. The invention defined in claim 3, wherein the first temperature range comprises approximately 400°–1000° F., the second temperature range begins at a temperature in excess of 3000° F., and the pressure is at least 1000 psi during at least a part of the second temperature range.

5. The invention defined in claim 1, wherein the forces are applied to the opposite portions of the outer surface of the composite throughout the step of continuously heating the composite and comprise forces applied in opposite directions to the opposite portions of the outer surface of the composite.

6. The invention defined in claim 5, whrerein the pressure applied to the composite is substantially constant throughout the step of continuously heating the composite.

7. The invention defined in claim 5, wherein the pressure applied to the composite is substantially constant at a first level during heating of the composite through at least a substantial portion of the first temperature range and is thereafter increased to and maintained substantially constant at a second level greater than the first level.

8. A method of converting a composite of material of substantially carbon composition and a resin binder into a high density, substantially all-carbon composite comprising continuously heating and simultaneously applying pressure to the composite over a selected time interval, the heating being carried out at a first rate through a temperature sufficient to substantially carbonize the resin binder and thereafter at a second rate different from the first rate and not less than about 1500° F./hr. through a temperature sufficient to substantially soften the composite, the application of pressure comprising forces applied to opposite portions of an outer surface of the composite throughout the step of continuously heating to compact and substantially densify the composite.

9. The invention defined in claim 8, wherein pressure is applied to the composite by a powder in contact with the composite.

10. The invention defined in claim 8, wherein the composite has a hollow interior and pressure is applied to the composite by disposing the composite within a die, filling the hollow interior of the composite with a powder and applying pressure to the powder on opposite sides of the composite.

11. The invention defined in claim 8, wherein the selected time interval comprises a first portion in which the composite is heated to a temperature of approximately 400°–1000° F. to cause substantial decomposition of the resin and a second portion immediately following the first portion in which the heating of the composite is continued at a rate of not less than about 1500° F./hr. until substantial softening of the composite occurs, the heating of the composite being thereafter continued so as to maintain the composite substantially soft during the remainder of the second portion of the selected time interval.

12. The invention defined in claim 11, wherein the pressure applied to the composite is substantially constant during the selected time interval and comprises the forces applied in opposite directions to the opposite portions of the outer surface of the composite.

13. The invention defined in claim 11, wherein the pressure applied to the composite assumes a first level during at least most of the first portion of the selected time interval, then increases to assume a second level during at least most of the second portion of the selected time interval, and comprises forces applied in opposite directions to opposite portions of an outer surface of the composite.

14. The invention defined in claim 11, wherein the pressure applied to the composite assumes a first level during at least most of the first portion of the selected time interval, then successively increases to a plurality of other levels during at least most of the second portion of the selected time interval, the pressure comprising forces applied in opposite directions to opposite portions of an outer surface of the composite.

15. A method of making a high density carbon-carbon composite from a composite of carbon material and an organic resin binder comprising the steps of:
forming the composite into a desired shape having an outer surface;
heating the composite to approximately 325° F. for a period of at least several minutes to effect at least partial curing of the resin binder; and
continuously heating the composite while applying compacting force to the outer surface thereof so as to substantially carbonize the resin binder and thereafter densify and heat treat the composite, said step of continuously heating comprising initially heating the composite at a first rate to approximately 1000° F. while applying the compacting force, thereafter heating the composite to a temperature above 3000° F. at a second rate greater than the first rate while applying the compacting force, and thereafter maintaining the composite at a temperature above 3000° F. for a selected period of time while applying the compacting force.

16. The invention defined in claim 15, wherein the step of continuously heating is carried out for a period of 6–12 hours.

17. The invention defined in claim 15, wherein the composite is maintained at a temperature of at least 5400° F. for the selected period of time.

18. The invention defined in claim 17, wherein the step of continuously heating is carried out over a total period of time in which the heating of the composite to approximately 1000° F. is carried out for approximately three-eighths of the total period of time, heating of the composite to a temperature above 3000° F. is carried out for approximately three-eighths of the total period of time, and maintaining the composite at a temperature above 3000° F. is carried out for approximately two-eighths of the total period of time.

19. A method of substantially densifying a composite of carbon and a resin binder which has been at least partially carbonized comprising continuously heating and simultaneously applying forces to opposite portions of the outer surface of the composite over a selected time interval, the heating initially being at a rate of not less than about 1500° F./hr. to raise the temperature of the composite to a level at which the composite becomes plastic while at the same time providing some compaction of the composite in the presence of the applied force during a first part of the selected time interval and to thereafter hold the temperature of the composite substantially constant to maintain the composite in a plastic state and provide substantial additional compaction of the composite in the presence of the applied forces during a second part of the selected time interval.

20. The invention defined in claim 19, wherein the forces provide a pressure of at least 300 psi during the selected time interval and the level at which the composite becomes plastic is in excess of 3500° F.

* * * * *

UNITED STATES PATENT AND TRADEMARK OFFICE
CERTIFICATE OF CORRECTION

PATENT NO. : 4,409,048

DATED : October 11, 1983

INVENTOR(S) : Donald M. Hatch et al

It is certified that error appears in the above—identified patent and that said Letters Patent are hereby corrected as shown below:

Column 5, line 24, after "forces" and before "applied", insert --is--; line 24, after "to" and before "opposite", insert --the--. Column 6, line 48, after "to the" (second occurrence) and before "that", "face" should read --fact--. Column 13, line 18, after "the" and before "temperature", "complete" should read --composite--. Column 15, line 24, after "claim 5" and before "the", "whrerein" should read --wherein--.

Signed and Sealed this

Thirteenth Day of March 1984

[SEAL]

Attest:

GERALD J. MOSSINGHOFF

Attesting Officer     Commissioner of Patents and Trademarks